United States Patent [19]
Hehl

[11] 3,912,133
[45] Oct. 14, 1975

[54] LEVER-ACTUATED BIAS FOR FLOW RESPONSIVE INJECTOR NOZZLE

[76] Inventor: Karl Hehl, Arthur-Hehl-Strasse 32, 7291 Lossburg, Germany

[22] Filed: July 16, 1974

[21] Appl. No.: 488,964

[30] Foreign Application Priority Data
July 16, 1973 Germany............................ 2336099
Feb. 28, 1974 Germany............................ 2409531

[52] U.S. Cl. ................ 222/496; 222/509; 222/518; 251/250; 251/321; 425/245 NS
[51] Int. Cl.² ........................................ B29F 1/03
[58] Field of Search .......... 251/250, 321, 325, 353, 222/509, 413, 514, 518, 522, 525, 559, 492, 493, 496; 425/DIG. 224, 245NS

[56] References Cited
UNITED STATES PATENTS
3,295,169  1/1967  Moslo .............................. 425/245 X
3,398,436  8/1968  Nouel ............................. 425/245 X
3,632,260  1/1972  Moslo .............................. 425/245
3,709,644  1/1973  Farrell ........................... 425/245 X
3,719,310  3/1973  Hunten ........................... 425/245 X FOREIGN PATENTS OR APPLICATIONS
656,120  9/1963  Italy.................................. 425/245
84,461  1/1965  France............................... 425/245

Primary Examiner—Drayton E. Hoffman
Assistant Examiner—David A. Scherbel
Attorney, Agent, or Firm—Joseph A. Geiger

[57] ABSTRACT

A lever-actuated injector nozzle, as part of an injection control device for the injection unit of an injection molding machine, the nozzle having an actuating lever connected to the valve plunger, which lever in turn is either biased by means of a spring, or connected to the piston rod of a control cylinder which receives hydraulic pressure from the hydraulic controls of the injection unit which rotates the plastification screw and axially advances it in an injection stroke.

7 Claims, 7 Drawing Figures

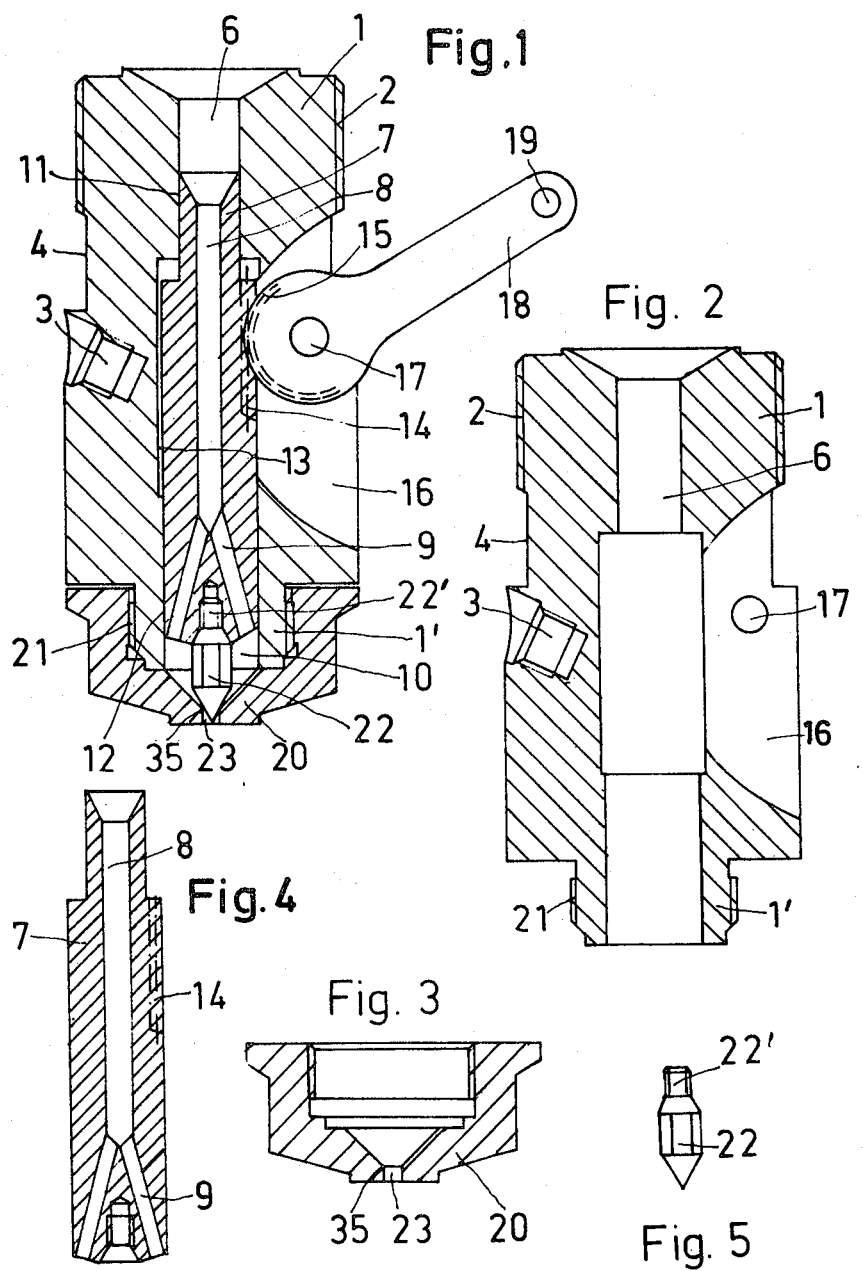

LEVER-ACTUATED BIAS FOR FLOW RESPONSIVE INJECTOR NOZZLE

BACKGROUND OF THE INVENTION

1. Field of the Invention

The present invention relates to injector nozzles for injection molding machines, and in particular to nozzles for the injection of plastic materials which have a forcibly openable and closable valve plunger activated by means of a reciprocating lever, whereby the injector nozzle is opened and closed in response to the hydraulic controls of the injection unit.

2. Description of the Prior Art

Various injector nozzles with closing valves are known from the prior art. They normally feature a centrally guided valve plunger which is biased to close the nozzle opening, and which, under the pressure buildup produced by the injection cylinder to which the nozzle is mounted, opens the nozzle passage for injection of the raw material into the molding die. Also known is a valve-controlled injector nozzle which is operatively connected to the injection unit so as to open in response to the displacement of the plastification screw inside its plastification cylinder. In this case, the valve plunger of the injector nozzle is connected to a reciprocating lever which in turn is connected to the controls of the injection unit. This operative connection has the shortcoming that it requires complex mechanical and hydraulical interconnections, prone to operating problems, and difficult to adjust. Such a device is disclosed in the German Utility Model (Gebrauchsmuster) No. 6,609,083.

SUMMARY OF THE INVENTION

It is a primary objective of the present invention to devise an improved injector nozzle of the earlier-mentioned type which, while being simplified for savings in manufacturing cost and for improved operational reliability, offers a means for starting and terminating the injection process with a high degree of timing accuracy and which, in an alternative mode of usage, also permits operation without the direct hydraulic link to the injection unit controls, thus responding to the raw material pressure itself, which opens the nozzle valve against a spring biasing the valve plunger against the injection orifice.

The present invention proposes to attain the above objectives by proposing an injector nozzle comprising a centrally arranged valve plunger which is movable axially in relation to a valve seat, thereby opening and closing an injection orifice, the valve plunger being connected to a pivotable actuating lever, which in turn is connected to the piston rod extending from a hydraulic control cylinder connected to the hydraulic controls of the injection unit. This connection is so arranged that, when the plastification screw inside the plastification cylinder is hydraulically advanced in an injection stroke, the hydraulic pressure advancing the screw also impinges on the piston of the hydraulic control cylinder for the injection nozzle, thereby retracting the valve plunger and opening the injection orifice for injection. Preferably, the operative hydraulic spaces of the cylinder which advances the plastification screw and of the control cylinder for the injector nozzle are in direct communication.

The hydraulic control cylinder for the injector nozzle is preferably designed as a double-acting cylinder, so that a second pressure space effects closing of the plunger valve inside the injector nozzle. This pressure space is connected to the pressure line of the hydraulic drive motor for the plastification screw, so that, when the plastification screw is rotated for plastification of a new raw material charge, the hydraulic pressure producing that rotation also maintains the injector nozzle safely closed.

In the mode of application outlined above, the closing force acting on the valve plunger is produced only as a result of hydraulic pressure derived from the injection unit controls. This mode has a certain disadvantage, inasmuch as it imposes certain restrictions on the operating cycle of the injection molding machine, especially when the latter is controlled by an operator. These restrictions are due to the fact that the closing pressure is only obtainable for as long as the plastification screw is rotated, meaning that, whenever an extended pause is necessary between injection strokes, the hydraulic pressure for the positive closing of the injector nozzle will be interrupted. This situation can be remedied in a simple manner, by deriving at least part of the closing force for the valve plunger from a spring. The use of such a spring has the additional operational advantage that the need to overcome this spring bias causes a slight delay in the opening motion of the valve, which delay creates a certain desirable increase in the initial injection pressure at the moment of nozzle opening.

The closing spring may be provided as an addition to the hydraulic closing force derived from the pressure line for the plastification screw drive, or the hydraulic closing force may be replaced entirely by the spring bias. In the former case, the spring is preferably arranged inside the hydraulic control cylinder to which the activating lever of the injector nozzle is connected. In the latter case, the closing spring may directly engage the activating lever of the injector nozzle. This mode becomes useful, when the hydraulic controls of the injection unit do not lend themselves readily for a direct operative connection to the activating lever of the injector unit.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows:

FIG. 1 illustrates, in a longitudinal cross section, a closed, lever-actuated injector nozzle embodying the invention;

FIG. 2 shows in a separate representation the sectioned nozzle body of FIG. 1;

FIG. 3 is a corresponding representation of the nozzle cap of FIG. 1;

FIG. 4 shows the valve plunger of FIG. 1;

FIG. 5 shows the nozzle pin of FIG. 1;

DESCRIPTION OF THE PREFERRED EMBODIMENTS

Figure 6:
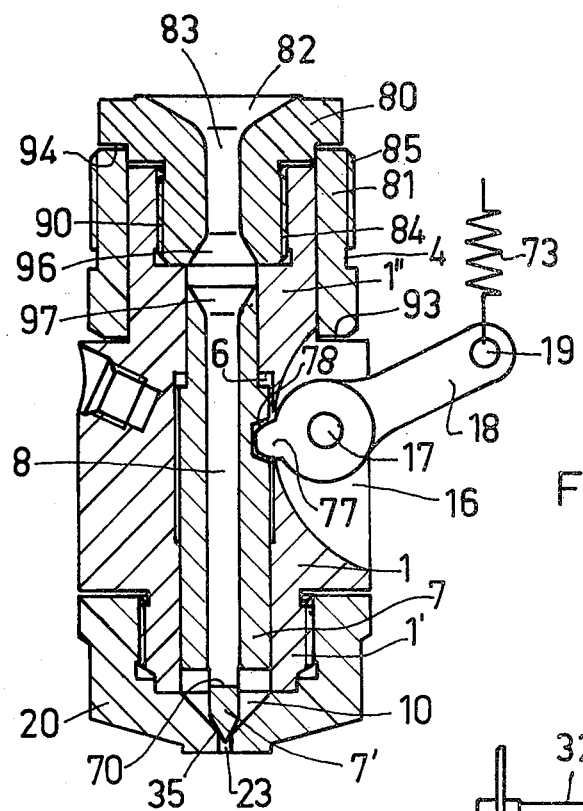
FIG. 6 illustrates, again in a longitudinal cross section, a second embodiment of the injector nozzle of the invention.

In FIGS. 1-5 is illustrated a first embodiment of the novel injector nozzle suggested by the invention. This injector nozzle is adapted for attachment to the discharge end of the plastification cylinder of an injection unit. For this purpose, the nozzle body 1 is provided with a male threaded portion 2 corresponding to a suitable female threaded portion in the plastification cylinder (not shown) of an injection unit. On its front end, i.e. the lower end in FIG. 1, the nozzle body 1 has another length portion 1' of reduced diameter with a male thread 21, onto which is screwed a nozzle cap 20. The hollow nozzle cap 20 defines in its forward end a nozzle passage, or injection orifice 23, through which plastic raw material is injected into a suitable injection molding die (not shown).

Inside a central longitudinal bore 6 of the nozzle body 1 is slidably fitted a valve plunger 7, carrying on its forward end a nozzle pin 22, the latter having a threaded shaft 22' engaging a threaded bore of the valve plunger 7. The forward end of the nozzle pin 22 has a pointed taper with which it engages the inner shoulder edge 35 of the injection orifice 23, which thereby serves as the valve seat. This valve seat is surrounded by a tapering enlarged bore leading to the much larger female mounting thread of the nozzle cap 20, the tapered portion of the cavity defining an antechamber for the injection orifice 23. Flat faces 4 on the outside of the nozzle body 1, and similar flat faces on the nozzle cap 20, are adapted for engagement by suitable wrenches.

The valve plunger 7 extends over the major portion of the length of nozzle body 1, its smaller upper portion 11 and larger lower portion 12 being closely fitted inside matching bore diameters 6 and 10 of body 1, while the mid-portion of the plunger 7 is surrounded by a clearance bore 13. The valve plunger 7 has a central axial injection channel 8 through which the plastic raw material passes from the rear end of the injector nozzle to the antechamber 10 surrounding the nozzle pin 22. In its forward portion, the injection channel 8 is bifurcated into at least two branch channels 9, in order to accommodate the threaded shaft 22' of nozle pin 22. A lateral threaded socket 3 in the mid-portion of nozzle body 1 serves for the insertion of the temperature sensor (not shown).

In the mid-portion of nozzle body 1 is further arranged a longitudinal slot 16 opening into the clearance bore 13 and accommodating an actuating lever 18 which is guided and rotatably positioned inside slot 16 by means of a transverse pivot pin 17, As can be seen in FIG. 1, the actuating lever 18 cooperates with the valve plunger 7 in a rack-and-pinion-type engagement, the plunger 7 having several straight teeth 14, and the lever 18 defining a segment of the spur gear 15. The plunger and the lever are thus operatively interconnected, so that a straightline motion of the former causes, or is caused, by an angular motion of the latter. To the far end of the actuating lever 18 is attachable, at 19, either the piston rod of a hydraulic control piston — to be described further below in connection with FIG. 7 — or a closing spring, as shown at 73 in FIG. 6, for example.

In FIG. 6 is illustrated a modified injector nozzle, representing a second embodiment of the invention. In this case, the nozzle body 1 does not itself have a threaded rear portion, but carries a rotatable threaded sleeve 81 which is axially confined between a shoulder 93 of the nozzle body 1 and an opposite shoulder 94 of a hollow end plug 80 whose threaded portion 84 is tightly threaded into a matching threaded recess 90 in the rear portion of body 1. This arrangement permits mounting of the injector nozzle in the front end of the plastification cylinder in any desired orientation. The injector nozzle itself no longer needs to be rotated while it is screwed into the plastification cylinder (embodiment of FIG. 1), but the nozzle can now be held in place, while the threaded sleeve 81 is screwed into a female thread of the plastification cylinder which matches the thread 85 of sleeve 81.

The central injection channel 83 extending through the end plug 80 has a suitable flared portion 82 at its rear end and a tapered portion 96 at its front end, the latter forming a smooth transition to the smaller guide bore 6 in the rear of the nozzle body 1.

Also modified in this embodiment is the valve plunger 7, which no longer carries a removable nozzle pin, but has an integral tapered pin extension 7'. The central injection channel 8 extending through plunger 7 opens at its rear portion with a taper 97. Just behind the pin extension 7' channel 8 bifurcates to opposite sides into the antechamber 10, the channel itself terminating at a flat bottom face 70.

The nozzle cap 20 is substantially identical to the one shown in FIG. 3. The cap 20, the threaded sleeve 81, and the end plug 80, are again provided with flat faces for engagement by matching wrenches.

The radial slot 16 of the embodiment of FIG. 6 is less deep than the similar slot of FIG. 1. The actuating lever 18, rather than having a plurality of teeth forming a gear segment, has a single tooth or cam 77, cooperating with a single matching transverse groove 78 of the valve plunger 7. This engagement is basically again of the rack-and-pinion-type, but the modified embodiment features larger contact surfaces and a stronger, more resistant tooth or cam 77.

FIG. 6 also features a closing spring 73 attached to the actuating lever 18 at its free end 19. This spring normally keeps the pin extension 7' of plunger 7 closed against the valve seat 35, exerting a certain preload thereagainst which can be overcome by the pressure generated in the plastic raw material by the advancing plastification screw. This pressure propagates axially through the valve plunger 7 into the antechamber 10. When it reaches a certain level, the valve plunger, having a larger piston surface on its forward end then on its rear end, acts as a differential piston, lifting itself from the valve seat 35 against the bias of spring 73. The injector nozzle then operates in a pressure-actuated mode. Of course, the nozzle of FIG. 1 is similarly operable in a pressure-actuated mode, if the spring 73 is used.

Figure 7:
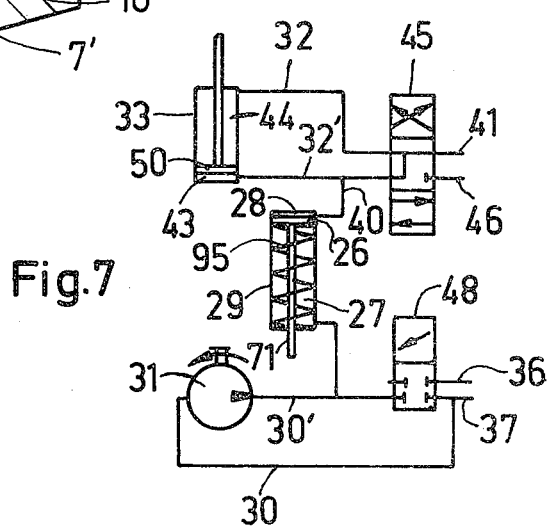
FIG. 7 shows in a schematic representation a portion of the hydraulic control circuit for an injection unit incorporating the injector nozzle of the invention.

Both embodiments of the injector nozzle may also be adapted to a different actuating mode, by replacing the closing spring 73 with a control cylinder of the type illustrated in FIG. 7. This figure shows schematically a portion of the hydraulic circuit which operates the injection unit of an injection molding machine. At 27 is shown a double-acting cylinder, the cylinder rod 71 being connected to the end 19 of of lever 18. The cylinder 29 thus serves as a means for opening and closing the injector nozzle. The lower cylinder chamber 27 is connected directly to the pressure line 30' of the hydraulic circuit 30 driving the plastification screw (not shown) by means of a hydraulic motor 31. The hydraulic pressure used to rotate the plastification screw thus tends to close the injector nozzle.

The opposite pressure chamber 28 of control cylinder 29 is similarly connected to the pressure line 32' of the hydraulic circuit 32 which provides the axial injection stroke on the plastification screw via a hydraulic cylinder 33. As soon as this hydraulic circuit is energized, the pressure reaching the upper cylinder space 28 from line 32' overcomes the closing pressure in the opposite cylinder space 27, thereby opening the valve of the injector nozzle.

Since the rotation of the plastification screw automatically stops, if a certain time interval in the injection cycle is exceeded, it may happen that the hydraulic control pressure derived from pressure line 30' is not always available to maintain the injector nozzle closed. For these cases, it is advisable to augment the hydraulic pressure inside the cylinder space 27 with a compression spring 95 which provides a closing bias similar to that obtainable in the previous mode of operation, with closing spring 73 (FIG. 6). In a variation to this arrangement, it is also possible to use the spring 94 exclusively as a source for closing bias, the control cylinder 29 being a single-acting cylinder. Its lower end would then be open, while its upper cylinder space 28 remains connected to the pressure line 32'. Of course, the two closing springs 73 and 95, respectively, are both preferably adjustable as to their preload, or a set of interchangeable springs is provided, in order to adapt the nozzle to different raw materials and different injection pressures.

The operation of the hydraulic system controlling the opening and closing of the injector nozzle is as follows:

Be it assumed that the injection of plastic raw material into the injection molding die has just been terminated. At this point, the injector nozzle is still open. The control valve 48 (FIG. 7) is now moved downwardly (as shown in the drawing), so that the supply line 36 communicates with the pressure line 30', which in turn then begins to drive the motor 31 of the plastification screw. The hydraulic fluid returns from the motor 31, through lines 30 and 37 to the fluid reservoir (not shown). The hydraulic pressure in line 30' is directly transmitted to the cylinder space 27 of the control cylinder 29. The piston rod 71 and its attached actuating lever 18 are therefore biased upwardly by both the hydraulic pressure and the preload of spring 95, to which combined force is opposed the hydraulic pressure present in cylinder space 28. This pressure, derived from pressure line 32' of the screw control cylinder 33, ceases at the instant at which the control valve 45 is opened, thereby terminating the advancing stroke of the plastification screw during which the raw material has been injected into the die. At this point, the piston 26 of control cylinder 29 is allowed to move upwardly, closing the injector nozzle. The rotation of the plastification screw by means of motor 31 advances granular plastic raw material along the plastification cylinder toward the forward end thereof and into the closed injector nozzle, while the plastification screw itself is progressively pushed back, and the piston 50 of control cylinder 33 is retracted accordingly (downward direction in FIG. 7). As soon as the desired amount of plastic raw material is plastified and accumulated in the front portion of the plastification cylinder, the control valve 45 opens again to pressurize line 32' for an injection stroke. At the same time, however, it also pressurizes the connecting line 40 and the upper cylinder space 28 of control cylinder 29. This pressure buildup in space 28 causes the piston 26 to move downwardly, thereby opening the injection nozzle just prior to the start of the injection stroke.

The novel lever-actuated injector nozzle of the invention has the advantage of offering greater versatility of usage, while providing more freedom of adaptation as far as the entire injection cycle is concerned. Under certain circumstances, especially when the physical arrangements make it difficult, the injector nozzle may be operated as a pressure-actuated nozzle, without the assistance of the hydraulic pressure of the injection unit control circuit. Alternatively, the injector nozzle may be connected to the control cylinder 29 which is part of the aforementioned hydraulic circuit, and which assures the forcible opening and closing of the valve of the injector nozzle in precise synchronism with the hydraulic controls of the injection unit.

It should be understood, of course, that the foregoing disclosure describes only preferred embodiments of the invention and that is is intended to cover all changes and modifications of these examples of the invention which fall within the scope of the appended claims.

I claim:

1. An injector nozzle for injection molding machines comprising:
    an elongated nozzle body having a rear mounting end and a front discharge end;
    a center bore extending axially through the nozzle body and defining in succession, from rear to front, an inlet, a small rear guide bore, a large front guide bore, an antechamber, and an injection orifice of greatly reduced diameter at the forward end of the bore;
    a valve seat disposed at the rearward entrance to the injection orifice;
    a valve plunger received inside the center bore of the nozzle body for axial movement therein, the plunger having a small diameter portion cooperating with the small guide bore to form a small, rearwardly facing piston area therewith and a large diameter portion cooperating with the large guide bore to form a large, forwardly facing piston area therewith, the thereby defined differential piston areas being exposed to the injection material flowing through the nozzle, which urges the valve plunger rearwardly, when the injection material is pressurized;
    an injection channel extending axially through the valve plunger into the antechamber of the nozzle body bore;
    a nozzle pin arranged at the front end of the valve plunger so as to cooperate with the valve seat, opening and closing the injection orifice, when the plunger moves accordingly;
    an actuating member operatively connected to the valve plunger and arranged to reach radially through the nozzle body; and
    means cooperating with the actuating member for biasing the valve plunger forwardly toward the closed position of its nozzle pin, in opposition to the differential piston action of the valve plunger.

2. An injector nozzle as defined in claim 1, wherein:

the nozzle body further includes a lateral slot opening into the mid-portion of the central bore, between the small and large guide bores, and a pivot pin extending transversely across the slot;

the actuating member is an actuating lever extending through the slot and being pivotably retained therein by the pivot pin; and the valve plunger and the actuating lever together define a rack-and-pinion-type drive engagement.

3. An injector nozzle as defined in claim 1, wherein the spring biasing the valve plunger is arranged to be readily interchangeable against another spring from a selection of differently calibrated springs.

4. An injector nozzle as defined in claim 1, wherein the center bore and the cooperating valve plunger define, in the axial space between their rear and front guide bores and matching plunger diameters portions, a length portion in which an annular clearance exists between the bore and the plunger.

5. An injector nozzle as defined in claim 1, wherein:
the nozzle body includes, at its front end, a removable nozzle cap, attached thereto by means of a threaded connection; and the injection orifice of the nozzle body bore is defined by the removable cap.

6. An injector nozzle as defined in claim 1, further comprising means for connecting the rear end of the nozzle body to the front end of a plastification cylinder from which plastified material is discharged through the injector nozzle.

7. An injector nozzle as defined in claim 6, wherein:
the connecting means includes a threaded sleeve having a male threaded portion and wrench faces, the sleeve being rotatable on a matching diameter portion of the nozzle body; and the nozzle body further includes an end collar facing the threaded sleeve with a clamping shoulder, so that the sleeve, when threaded into a matching female-threaded recess of a plastification cylinder, clamps the end collar of the nozzle body into said recess.

* * * * *